June 9, 1936.　　C. B. SEGOVIA　　2,043,778
SQUARE AUGER
Filed Nov. 15, 1935
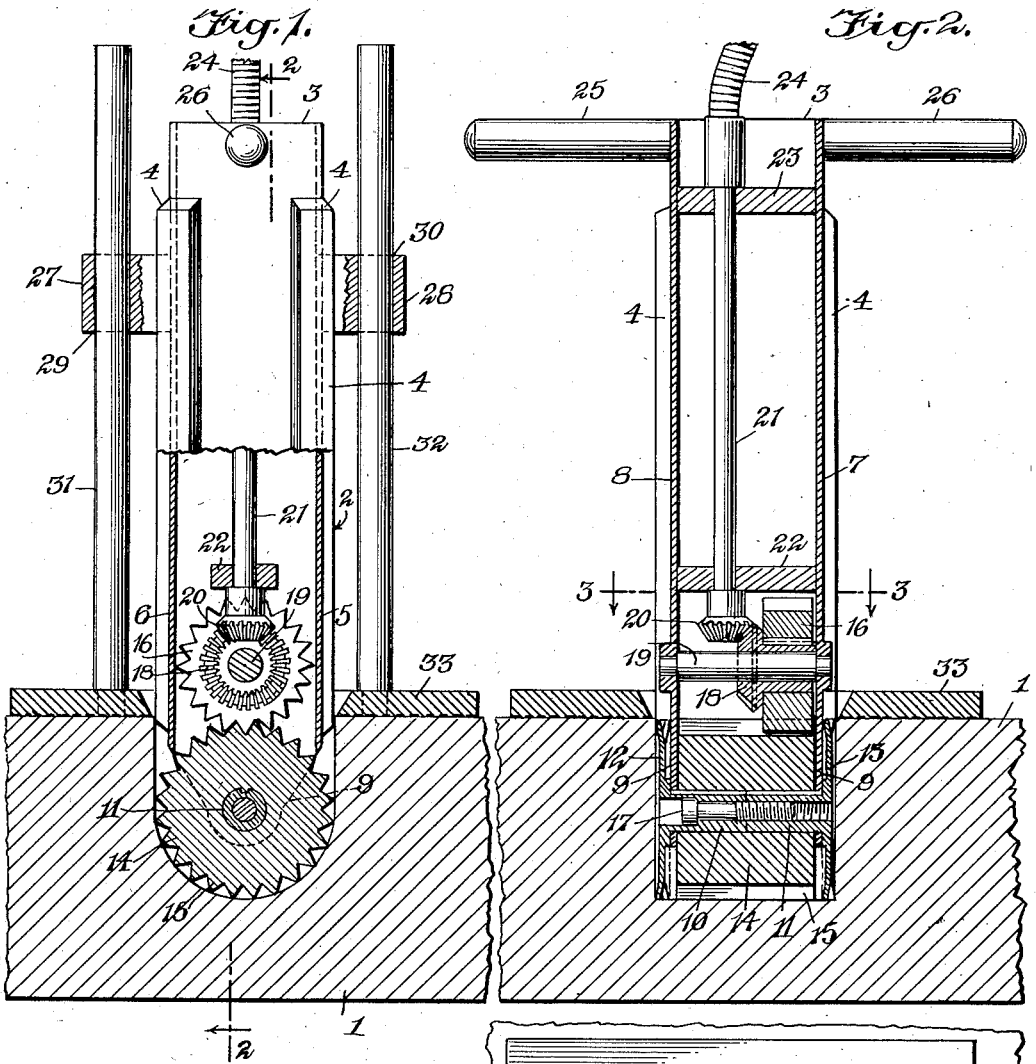
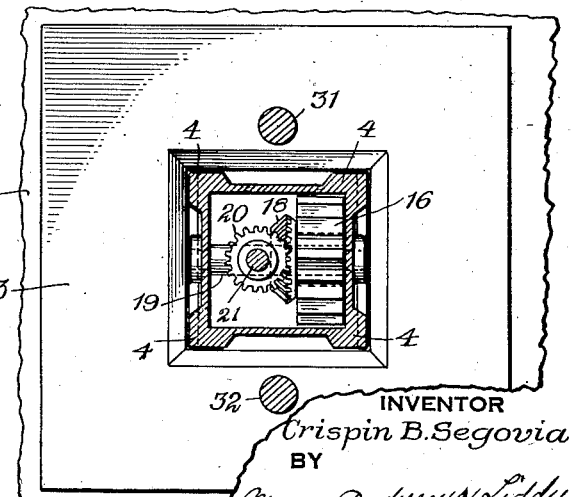
INVENTOR
Crispin B. Segovia Patented June 9, 1936

2,043,778

UNITED STATES PATENT OFFICE 2,043,778

SQUARE AUGER

Crispin B. Segovia, New York, N. Y.

Application November 15, 1935, Serial No. 50,013

3 Claims. (Cl. 145—122)

This invention relates to drilling devices, and particularly to an improved auger structure adapted to drill or produce a square hole or square passageway in a piece of wood or other object.

An object of the invention is to provide a simple strong construction which will not easily get out of order and which may be readily applied to any surface to drill a hole therein.

Another object of the invention is to provide a construction wherein a main cutting or boring tool is used and trimming tools positioned to co-operate therewith so that the device will more easily cut the material being drilled during the drilling operation.

An additional object, more specifically, is to provide a square auger which may be easily manipulated and which may be driven by power carried by the auger or connected therewith by a flexible shaft or other device whereby ample power is always provided for driving the rotating parts.

In the accompanying drawing:

Fig. 1 is a vertical sectional view with certain parts in elevation disclosing an embodiment of the invention as it appears when in use;

Fig. 2 is a sectional view through Fig. 1 approximately on line 2—2; and

Fig. 3 is a transverse sectional view through Fig. 2 approximately on line 3—3.

Referring to the accompanying drawing by numeral, 1 indicates an object to be drilled. Object 1 may be a piece of wood, metal or other material and of any desired thickness. The auger structure 2 may be of any desired size and may be used to drill a square hole into object 1 or entirely through object 1. The auger 2 includes a rectangular casing 3 of sheet metal having enlarged stiffening and bracing corners 4. At the lower end the side walls 5 and 6 are cut away and the side walls 7 and 8 are tapered as indicated at 9. The tapering portion 9 of the respective side walls is provided with openings for receiving the respective bearing sleeves 10 and 11. These sleeves may be integral with or rigidly secured to circular saws 12 and 13 as illustrated in Fig. 2. A cutter 14 is keyed to these bearing sleeves so that the cutter 14 and saws 12 and 13 will all rotate in unison. The cutter 14 may be a solid piece of steel having V-shaped teeth 15 or may be formed as an ordinary milling cutter now in common use. It will also be evident that this cutter could be made in other ways but when in use will shave or cut away the material of article 1 as it is pressed against the article. Also the cutter 14 must be of some form of toothed structure so as to mesh with the gear wheel 16 whereby it is rotated and it in turn rotates the saws 12 and 13.

From Fig. 2 it will be noted that a screw 17 screws into the sleeve 11 and clamps the sleeve 10 against the same. Gear 16 has a bevel gear 18 rigidly keyed or otherwise secured thereto so as to rotate therewith. Bevel gear 18 is rotatably mounted on the pin 19 and also continuously meshes with a pinion 20 which is rigidly secured to shaft 21. The shaft 21 is journaled in a spider 22 near pinion 20 and journaled near the opposite end in a spider 23. Shaft 21 extends through spider 23 and is shown connected with a flexible shaft 24 which is adapted to be driven by electric or other power element when the device is in use. If desired, the electric motor could be directly connected with shaft 21 though ordinarily the flexible shaft 24 is interposed between the motor and shaft 21. A pair of handles 25 and 26 are rigidly secured to the casing 8 whereby the device may be properly manipulated and properly held in place during the boring operation. Also a pair of lugs 27 and 28 are rigidly secured to the casing 8 as shown in Fig. 1. These lugs are provided with apertures 29 and 30 respectively for accommodating the guide shafts 31 and 32, which guide shafts are rigidly secured in any desired manner to a supporting plate 33.

When the device is first applied to an article the plate 33 may be clamped thereto by any form of clamp or if the auger is small the parts may be held thereon by the foot of the operator. The holding of the plate 32 is necessary when starting to drill as the rotation of the cutter would move the device horizontally over the article rather than drill a hole therein. By holding the plate 33 stationary and pressing downwardly on the handles 25 and 26 the cutter 14 and the saws 12 and 13 will cut a square hole directly into the article when the cutter and associated parts are functioning. There will be left a small uncut portion opposite the projections 9 but this quite often is broken away by the shaking and agitation of the parts. However, when the material is tough and the parts are not broken away the auger is forced into the article until the lower ends of members 9 strike the article. The auger is then withdrawn and turned one-fourth of a revolution and inserted. This action may be carried out until the desired depth of hole is secured or until a passageway has been cut entirely through the article.

As illustrated it will be seen that the train of gears are of sturdy structure so as to take care of the power necessary to operate the saws and cutter. If desired a greater multiplying of the power may be secured by changing the train of gears, although ordinarily the structure shown is preferable by reason of its simplicity. In action the cutter 14 and the saws 12 and 13 may operate at any desired speed. For instance, it may operate at a few hundred revolutions per minute though a much higher speed has been found desirable as, for instance, from three thousand to four thousand revolutions per minute. During the drilling operation the sawdust is thrown upwardly and either out into the air or into the interior of casing 8. In case the hole is being drilled to a great depth and a large supply of sawdust has accumulated the auger may be removed and the sawdust shaken out. This may be done as often as necessary though for very small articles it may not be necessary until after the complete hole has been drilled.

I claim:

1. An auger for drilling a square hole, said auger comprising a cylindrical one-piece cutter of greater diameter than length, a saw slightly spaced from each end of said cutter, each of said saws being in the form of a disk and of the same diameter as said cutter, a casing having apertured projections, said saws having tubular shanks extending through the apertures in said projections into the center of the cutter, means for clamping said shanks together, said shanks being keyed to said cutter whereby the cutter and saws will rotate as a unit, and power means for driving said cutter.

2. An auger for drilling a square hole, said auger including a cylindrical shaped cutter having teeth on the periphery and a bore in the center extending entirely therethrough, a saw adjacent each end of said cutter connected to the cutter so as to rotate therewith, a gear wheel meshing with the teeth of the cutter, a power mechanism connected with said gear wheel for driving the same, and a casing for said gear wheel and associated parts, said casing having projections carrying said cutter and said saws with the projections positioned between the saws and the cutter leaving a narrow uncut portion of the work beneath said projections because of which the device during operation is removed and rotated a part of a revolution and reinserted from time to time to cause the device to cut the uncut parts beneath said projections.

3. A device for drilling a square hole directly into an article, said device including a cylindrical cutter having teeth on the periphery and a centrally positioned bore, a disk shaped saw arranged adjacent each end of the cutter, said saw being of the same diameter as the cutter and arranged parallel to the ends of the cutter, each of said saws having a tubular sleeve projecting therefrom into the aperture in said cutter, one of said sleeves being internally threaded and the other sleeve being provided with a shoulder, a screw having a threaded part acting on the threads of the internally threaded sleeve and the head acting against said shoulder for clamping said sleeves together, and means for connecting power to said cutter for driving the same, said sleeves being connected with said cutter whereby said saws will be driven simultaneously with the cutter.

CRISPIN B. SEGOVIA.